US010142820B2

(12) United States Patent
Root

(10) Patent No.: US 10,142,820 B2
(45) Date of Patent: Nov. 27, 2018

(54) CONSUMER APPLIANCE WITH A DETACHABLE TABLET

(71) Applicant: General Electric Company, Schenectady, NY (US)

(72) Inventor: Steven Keith Root, Buckner, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 343 days.

(21) Appl. No.: 15/052,921

(22) Filed: Feb. 25, 2016

(65) Prior Publication Data
US 2017/0248925 A1 Aug. 31, 2017

(51) Int. Cl.
*G05B 15/02* (2006.01)
*H04W 4/70* (2018.01)
*H04L 29/08* (2006.01)
*F25D 29/00* (2006.01)

(52) U.S. Cl.
CPC ............ *H04W 4/70* (2018.02); *F25D 29/005* (2013.01); *H04L 67/12* (2013.01); *F25D 2400/361* (2013.01)

(58) Field of Classification Search
CPC ........ G05B 15/02; H04W 4/70; H04W 4/005; F25D 29/003; H04L 67/12
See application file for complete search history.

(56) References Cited

U.S. PATENT DOCUMENTS

| 6,993,485 | B2* | 1/2006 | Ferragut, II | ............ F25D 29/00 62/126 |
| 7,363,031 | B1* | 4/2008 | Aisa | ................... H02J 13/0079 455/419 |
| 2003/0028259 | A1* | 2/2003 | Hood | .................... D06F 39/005 700/17 |
| 2008/0143489 | A1* | 6/2008 | Castaldo | ................... G06F 9/54 340/286.01 |
| 2008/0165504 | A1* | 7/2008 | McCoy | .................. F16M 11/08 361/724 |
| 2008/0165998 | A1* | 7/2008 | LeClear | .................. D06F 39/00 381/345 |
| 2008/0178633 | A1* | 7/2008 | Jeong | .................... D06F 39/005 68/12.23 |
| 2009/0158766 | A1* | 6/2009 | Cooper | ................. F25D 29/006 62/389 |
| 2009/0306827 | A1 | 12/2009 | Kim et al. | |
| 2010/0268595 | A1 | 10/2010 | Littrell | |
| 2016/0267910 | A1* | 9/2016 | Lee | ..................... H04L 12/2816 |

FOREIGN PATENT DOCUMENTS

JP 2000275612 A 10/2000

* cited by examiner

*Primary Examiner* — Toan K Le
(74) *Attorney, Agent, or Firm* — Dority & Manning, P.A.

(57) ABSTRACT

A tablet for use with a consumer appliance is provided. The tablet may be removably attachable to the consumer appliance, which may charge the tablet through an integrated USB charger. The tablet may be in wired or wireless communication with the appliance and/or a remote server. In this manner, the tablet may provide the user with timely information related to operation of the consumer appliance or directly from the internet.

20 Claims, 3 Drawing Sheets

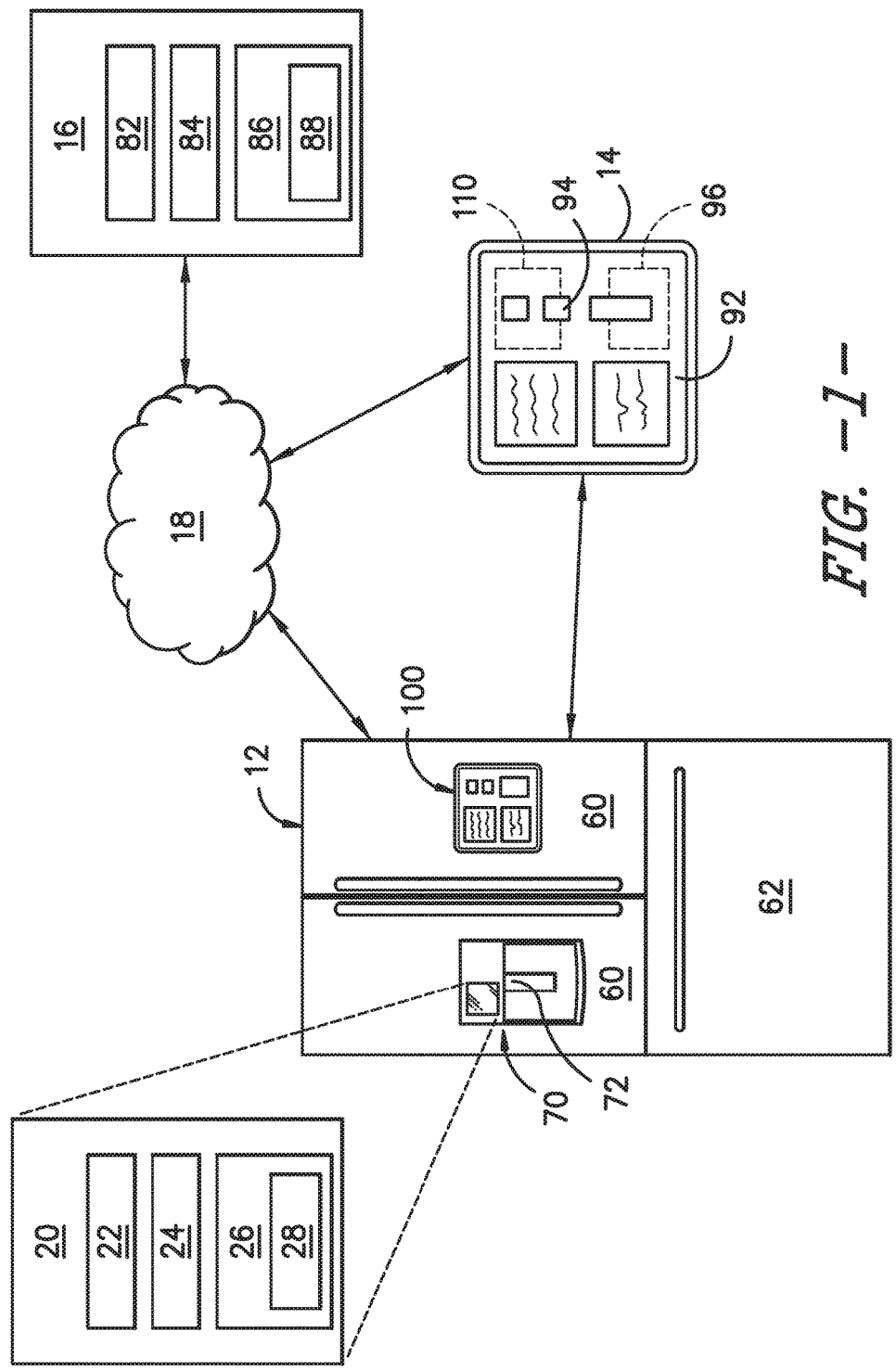
FIG. -1-

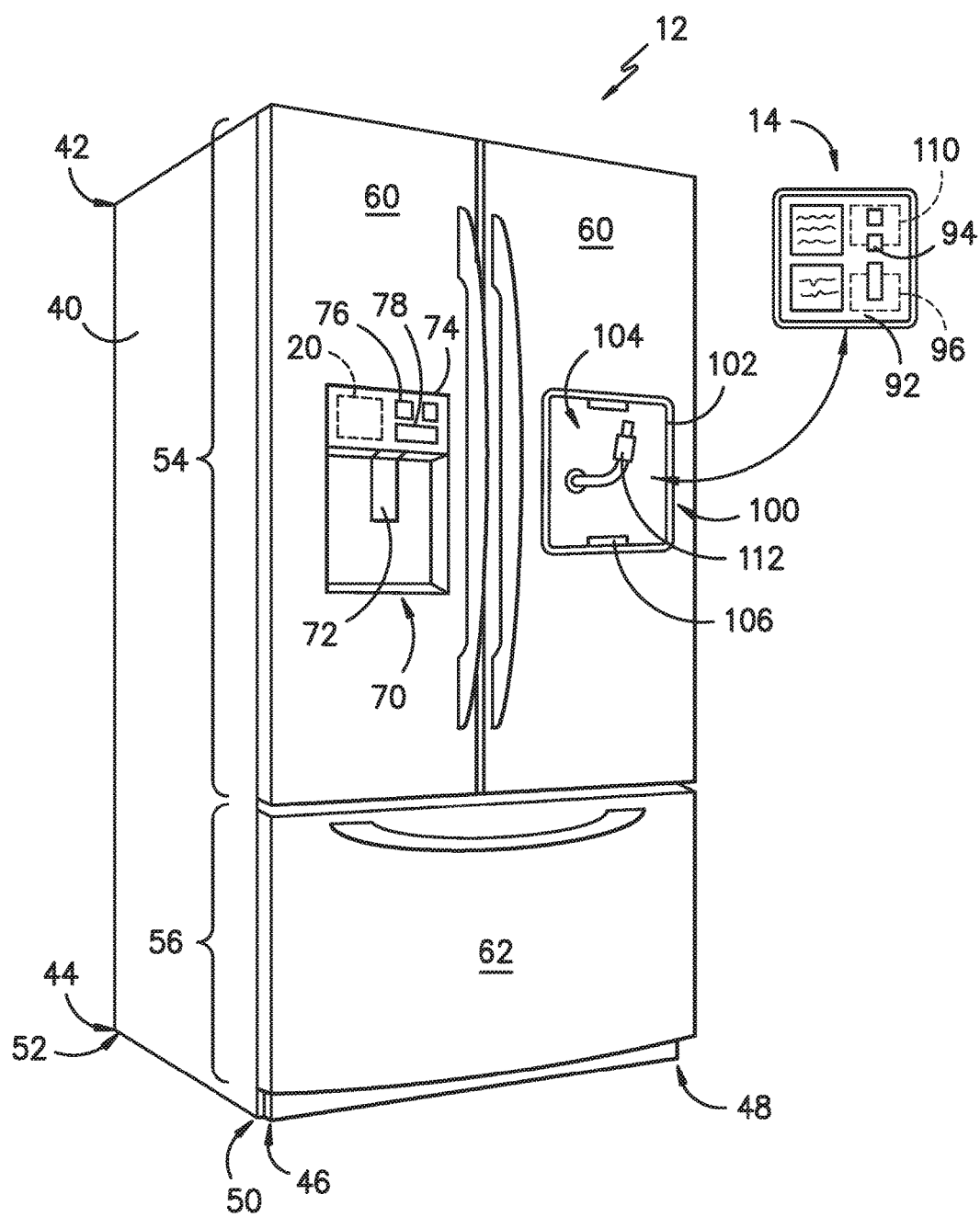
FIG. -2-

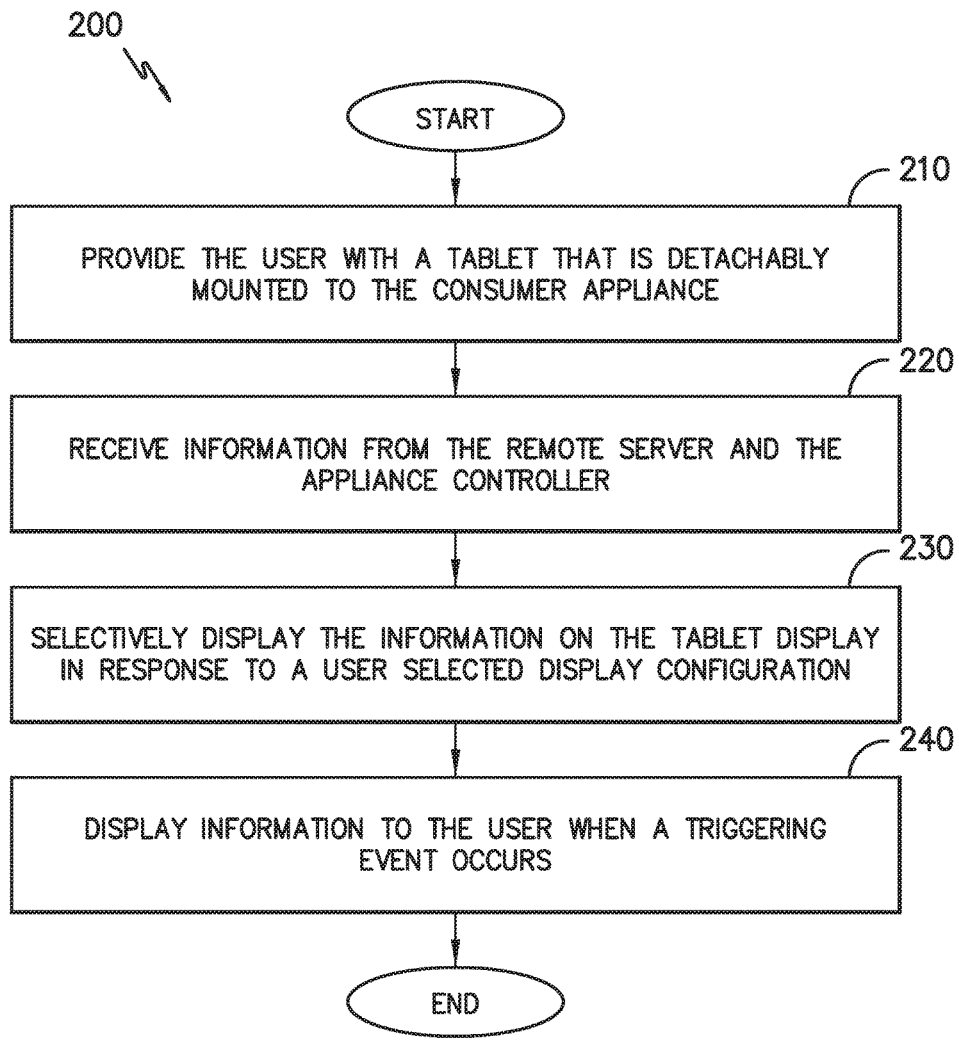
FIG. -3-

CONSUMER APPLIANCE WITH A DETACHABLE TABLET

FIELD OF THE INVENTION

The present disclosure relates generally to consumer appliances, or more specifically, to a tablet for providing a user of a consumer appliance with information or advertisements.

BACKGROUND OF THE INVENTION

Certain consumer appliances include displays that provide users with useful information or enable control of the consumer appliance. For example, on a door of a refrigerator appliance, a display may be attached and operatively coupled with the refrigerator control system to allow the user to adjust operational parameters, such as temperature settings or icemaker settings. In addition, the display may provide the user with useful information related to refrigerator operation or may provide information from the internet, such as news or weather. Such displays are often attached to the consumer appliance and heavily integrated with the control system of the consumer appliance.

However, as displays become obsolete due to advances in technology and products become available that are newer and more desirable to the consumer, conventional displays are often not easily replaceable or updateable. For example, these displays are often fixed to the consumer appliance and require significant disassembly to remove or replace. Even if the display is detachable from the appliance, it is often tightly integrated with the control system of the consumer appliance and is not easily interchangeable with newer models.

Furthermore, these displays are often highly dependent on communication with the appliance controller for operation. More specifically, these displays are often directly connected to the appliance and rely on power supplied from the controller. In addition, even if the displays are battery powered, they typically rely on the controller of the consumer appliance to provide connection to a network, e.g., to connect to a network and display timely content directly from the internet. As a result, conventional displays are of limited benefit to the consumer and quickly become outdated as newer technologies emerge.

Accordingly, a consumer appliance capable of communicating with a detachable and interchangeable tablet would be useful. More particularly, a tablet that may be removably mounted to a consumer appliance and may communicate directly with the appliance or a network would be especially beneficial.

BRIEF DESCRIPTION OF THE INVENTION

The present subject matter provides a tablet for use with a consumer appliance. The tablet may be removably attachable to the consumer appliance, which may charge the tablet through an integrated USB charger. The tablet may be in wired or wireless communication with the appliance and/or a remote server. In this manner, the tablet may provide the user with timely information related to operation of the consumer appliance or directly from the internet. Additional aspects and advantages of the invention will be set forth in part in the following description, may be apparent from the description, or may be learned through practice of the invention.

In one exemplary embodiment, a tablet for providing a user of a consumer appliance with information is provided. The tablet includes a display for providing information to a user, a user interface configured for receiving user input, and a wireless communication module enabling wireless communication with a remote server and an appliance controller. The tablet is removably mounted to the consumer appliance and may selectively display information received from the remote server and the appliance controller in response to the user input.

In another exemplary embodiment, a consumer appliance is provided. The consumer appliance includes a main body, an appliance controller, and a tablet removably mounted to the main body. The tablet includes an energy storage device, a display for providing information to a user, a user interface configured for receiving user input, and a wireless communication module enabling the tablet to communicate wirelessly with both the appliance controller and a remote server. The information provided to the display may be user selected from information received from the remote server and the appliance controller.

In still another exemplary embodiment, a method for communicating information to a user of a consumer appliance is provided. The method includes providing the user with a tablet that is detachably mounted to the consumer appliance, the tablet including a display and a wireless communication module in wireless communication with both a remote server and an appliance controller. The method further includes receiving information from the remote server and the appliance controller and selectively displaying the information on the display in response to a user selected display configuration.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 is a schematic diagram of a system for providing information to a user of a consumer appliance according to an exemplary embodiment of the present subject matter.

FIG. 2 illustrates a refrigerator appliance including a removable tablet according to an exemplary embodiment of the present disclosure.

FIG. 3 illustrates a method for providing a user of a consumer appliance with information related to appliance operation or directly from the internet according to an exemplary embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a schematic diagram of a system 10 for providing a consumer with information related to the operation of a consumer appliance and access to the internet according to an exemplary embodiment of the present subject matter. In general, system 10 may include one or more consumer appliances, e.g., refrigerator appliance 12, and a tablet 14, that are communicatively coupled both to each other and to a remote server 16. In this regard, system 10 is configured to provide relevant, consumer configurable information directly to the consumer via tablet 14.

Although a refrigerator appliance 12 is used herein according to an exemplary embodiment to describe aspects of the present subject matter, one skilled in the art will appreciate that the present subject matter applies to any other suitable appliance. For example, system 10 may be implemented using one or more refrigerators, dishwashers, ovens, ranges, microwave ovens, washing machines, clothes dryers, water heaters, air conditioning units, heating and ventilation units, or any other suitable consumer appliance. Indeed, aspects of the present disclosure may even be applied to large commercial appliances and industrial equipment.

In addition, more than one appliance may be used in system 10 and other appliances and systems may incorporate aspects of the present subject matter and remain within the scope of the invention. For example, tablet 14 may be interchangeably used with multiple appliances, may be communicatively coupled to each of those appliances, and may be configured to operate in a distinct manner with respect to each appliance. In this regard, tablet 14 may be compatible with a variety of control systems and appliance operating systems.

In addition, a tablet 14 may be directly connected to remote server 16 through a network 18. Network 18 can be any type of communication network. For example, network 18 can include one or more of a wireless network, a wired network, a personal area network, a local area network, a wide area network, the internet, etc. According to an exemplary embodiment, tablet 14 may communicate with remote server 16 over network 18, such as the internet, to request and receive useful information for the consumer, as described below.

According to the illustrated embodiment of FIG. 1, refrigerator appliance 12 may include a controller 20. Various components of exemplary controller 20 are illustrated in schematic fashion in FIG. 1. As shown, controller 20 may include one or more processor(s) 22 and associated memory device(s) 24 configured to perform a variety of computer-implemented functions (e.g., performing the methods, steps, and the like disclosed herein). By way of example, processor 22 may include one or more microprocessors, such as general or special purpose microprocessors operable to execute programming instructions or micro-control code associated with an operating cycle. Memory 24 may represent random access memory such as DRAM, or read only memory such as ROM or FLASH. In one embodiment, processor 22 executes programming instructions stored in memory 24. Memory 24 may be a separate component from processor 22 or may be included onboard within processor 22.

Additionally, controller 20 may also include a communications module 26 to facilitate communications between controller 20 and various other components of system 10. For instance, the communications module 26 may serve as an interface to permit controller 20 to transmit and/or receive from remote server 16 performance data related to operating cycles, appliance firmware updates, or other useful information. In addition, communications module 26 may permit direct communication with tablet 14, as discussed below. According to some exemplary embodiments, communications module 26 may also include an interface 28 (e.g., one or more analog-to-digital converters) to permit input signals to be converted into signals that can be understood and processed by the processor 22.

FIG. 2 provides a perspective view of refrigerator appliance 12 according to an exemplary embodiment of the present subject matter. Refrigerator appliance 12 includes a cabinet or housing 40 that extends between a top 42 and a bottom 44 along a vertical direction V, between a first side 46 and a second side 48 along a lateral direction L, and between a front side 50 and a rear side 52 along a transverse direction T. Each of the vertical direction V, lateral direction L, and transverse direction T are mutually perpendicular to one another.

Housing 40 defines chilled chambers for receipt of food items for storage. In particular, housing 40 defines fresh food chamber 54 positioned at or adjacent top 42 of housing 40 and a freezer chamber 56 arranged at or adjacent bottom 44 of housing 40. As such, refrigerator appliance 12 is generally referred to as a bottom mount refrigerator. It is recognized, however, that the benefits of the present disclosure apply to other types and styles of refrigerator appliances such as, e.g., a top mount refrigerator appliance or a side-by-side style refrigerator appliance. Consequently, the description set forth herein is for illustrative purposes only and is not intended to be limiting in any aspect to any particular refrigerator chamber configuration.

Refrigerator doors 60 are rotatably hinged to an edge of housing 40 for selectively accessing fresh food chamber 54. In addition, a freezer door 62 is arranged below refrigerator doors 60 for selectively accessing freezer chamber 56. Freezer door 62 is coupled to a freezer drawer (not shown) slidably mounted within freezer chamber 56. Refrigerator doors 60 and freezer door 62 are shown in the closed configuration in FIG. 2.

Refrigerator appliance 12 also includes a dispensing assembly 70 for dispensing liquid water and/or ice. Dispensing assembly 70 includes a dispenser 72 positioned on or mounted to an exterior portion of refrigerator appliance 12, e.g., on one of refrigerator doors 60. Refrigerator door 60 may define an internal icebox compartment housing an icemaker and an ice storage bin (not shown) that are configured to supply ice to dispenser 72.

Controller 20 may be positioned in a variety of locations throughout refrigerator appliance 12. As illustrated in FIG. 2, controller 20 is located within dispensing assembly 70 and may be provided for controlling the operation of refrigerator appliance 12. In the exemplary embodiment illustrated in FIG. 1, controller 20 may be located proximate a user interface panel 74 of refrigerator appliance 12. In such an embodiment, input/output ("I/O") signals may be routed between the controller 20 and various operational components of refrigerator appliance 12 along wiring harnesses that may be routed through a cabinet of refrigerator appliance 12. Typically, controller 20 is in communication with user interface panel 74, which may represent a general purpose I/O ("GPIO") device or functional block.

According to an exemplary embodiment, user interface panel 74 may include controls 76 through which a user may select various operational features and modes of refrigerator appliance 12. In one embodiment, controls 76 may include one or more of a variety of electrical, mechanical, or electro-mechanical input devices including rotary dials, push buttons, and touch pads. User interface panel 74 may also include a display component, such as a digital or analog display device 78 designed to provide operational feedback to a user and allow for monitoring the progress of an operating cycle. For example, user interface panel 74 may include a plurality of user inputs (not labeled), such as a water dispensing button and an ice-dispensing button, for selecting a desired mode of operation such as crushed or non-crushed ice.

User interface panel 74 may be in communication with controller 20 via one or more signal lines or shared communication busses. Controller 20 may also be communication with one or more sensors to monitor the operation of refrigerator appliance 12. For example, according to an exemplary embodiment, refrigerator appliance 12 includes temperature sensors for measuring and monitoring the temperature of fresh food chamber 54 and freezer chamber 56. In this manner, controller 20 may operate refrigerator appliance 12 in response to user manipulation of user interface panel 74 and can also receive performance feedback from sensors placed throughout appliance 12. In addition, performance data or cycle status indicators may be indicated to the user with display 78.

As mentioned above, system 10 may further include remote server 16. Remote server 16 may generally operate to store, receive, and transmit signals associated with refrigerator appliance 12, and may thus be in communication with refrigerator appliance 12 through controller 20. For example, remote server 16 may include one or more processor(s) 82 and associated memory device(s) 84 configured to perform a variety of computer-implemented functions (e.g., performing the methods, steps, and the like disclosed herein). By way of example, processor 82 may include one or more microprocessors, such as general or special purpose microprocessors operable to execute programming instructions or micro-control code associated with an operating cycle. Memory 84 may represent random access memory such as DRAM, or read only memory such as ROM or FLASH. In one embodiment, processor 82 executes programming instructions stored in memory 84. Memory 84 may be a separate component from processor 82 or may be included onboard within processor 82.

Additionally, the remote server 16 may also include a communications module 86 to facilitate communications between the remote server 16 and controller 20 and various other components of the system 10, such as a user input panel 74, as discussed below. Moreover, the communications module 86 may include an interface 88 (e.g., one or more analog-to-digital converters) to permit input signals to be converted into signals that can be understood and processed by the processor 82.

Remote server 16 is remote, and thus external to refrigerator appliance 12 which is typically located at a single location, e.g., a consumer's residence. Remote server 16 may, for example, be in another room of a house or building in which the system 10 is utilized, or in a neighboring building, etc. Alternatively, and in exemplary embodiments, the remote server 16 is a cloud-based server 16, and is thus located at a distant location, such as in a separate state, country, etc. The remote server 16 may be in wireless communication with the refrigerator appliance 12 (and controller 20), such as through network 18. Network 18 can also include a direct connection with related devices, such as tablet 14, as discussed herein, and the remote server 16. Moreover, remote server 16 may be in communication with tablet 14 through refrigerator appliance 12—e.g., refrigerator appliance 12 may receive information from network 18 and communicate that information to tablet 14 via a wired or wireless connection. In general, communication between the remote server 16 and the client devices may be carried via a network interface using any type of wireless connection, using a variety of communication protocols (e.g. TCP/IP, HTTP, SMTP, FTP), encodings or formats (e.g. HTML, XML), and/or protection schemes (e.g. VPN, secure HTTP, SSL). Accordingly, operating cycle and status information may be transmitted from controller 20 to the remote server 16 using the network 18.

As will be understood by those skilled in the art, refrigerator appliance 12 illustrated in FIG. 1 is provided only for the purpose of explanation and is not intended to limit the scope of the present subject matter. Aspects of the present subject matter may be used with any suitable number and type of appliances and it should be appreciated that the invention is not limited to any particular style, model, or configuration of these appliances. Indeed, the present subject matter may be used with other consumer or commercial appliances, such as, cooking appliances, dishwashers, microwave ovens, refrigerators, etc. In addition, one skilled in the art will appreciate that the schematic diagram shown in FIG. 1 is a simplified representation of the appliances and communication links that may be used to perform certain aspects of the present subject matter. Other components may be used, other configurations are possible, and these variations may be within the scope of the present subject matter.

Tablet 14 may be any suitable device for communicating information and receiving input from a user. According to the illustrated embodiment, tablet 14 includes at least a display 92 and one or more input buttons 94. More specifically, according to the illustrated embodiment, tablet 14 may have one large touch-screen display that allows a user to view and manipulate information directly on display 92. Other configurations of tablet 14 are possible and within the scope of the present subject matter. For example, tablet 14 may instead have a small display and a plurality of push buttons.

Tablet 14 further includes a controller 96 for controlling operation of tablet 14 and for communicating with appliance controller 20 and remote server 16, as described herein. Tablet controller 96 may operate in the same manner and have the same components as controller 20. In this regard, tablet controller 96 may be in operative communication with refrigerator appliance 12 via refrigerator controller 20 or with remote server 16 via network 18. According to alternative embodiments, tablet 14 may be in further communication with other wireless devices, other appliances, other wireless networks, etc.

Although tablet 14 is described above as including controller 96 for establishing wireless communication with appliance controller 20 and remote server 16, one skilled in the art will appreciate that suitable wired connections may also be used. For example, tablet 14 may have a direct wired connection with appliance controller 20 for transmitting data and/or charging tablet 14, as described below.

In order to receive tablet 14, refrigerator appliance 12 may include a tablet mounting assembly 100. Tablet mounting assembly 100 may include a mounting frame 102 that is attached to refrigerator door 60. Frame 102 may surround a recess 104 in refrigerator door 60 such that tablet 14 may be placed within frame 102 and can sit flush with a front surface of refrigerator door 60. Frame 102 may further define one or more securing tabs 106. Securing tabs 106 are protrusions or clips configured to secure tablet 14 when it is placed in mounting assembly 100. Although securing tabs 106 are described as securing tablet 14 in frame 102, one skilled in the art will appreciate that other means of detachably securing tablet 14 within frame 102 are possible and within the scope of the present subject matter.

Tablet 14 may further include an energy storage device. In this manner, tablet 14 may be completely detachable from refrigerator appliance 12. According to an exemplary embodiment, energy storage device is a lithium-ion battery pack 110. However, any suitable energy storage device may be used, e.g., a capacitor bank, fuel cell, etc.

Refrigerator appliance 12 may include a universal serial bus (USB) charger 112. More specifically, USB charger 112 may extend from an internal power source within refrigerator appliance 12 through recess 104. Tablet 14 may be configured to charge battery pack 110 when connected to USB charger 112. In addition, USB charger 112 may be used to provide a wired connection for transmitting data between refrigerator appliance 12 and tablet 14. Alternatively, an additional wired or any other suitable data connection may be established. When tablet 14 is connected to USB charger 112 and mounted within frame 102, USB charger 112 may remain hidden within recess 104 and behind tablet 14, thereby providing a seamless integration between tablet 14 and refrigerator appliance 12.

Notably, although USB charger 112 is illustrated as the means for providing power to tablet 14 or other devices connected to refrigerator appliance 12, one skilled in the art will appreciate that other electrical connections and charging configurations are possible and within the scope of the present subject matter. Notably, however, USB charging is a conventionally used method for charging personal electronic devices. Therefore, USB charger 112 is contemplated as likely being compatible with future electronic devices that may upgrade or replace tablet 14. In this manner, as the technology in tablet 14 becomes obsolete or less desirable, a consumer may buy a new replacement which will still be compatible with refrigerator appliance 12 and operable within system 10.

Now that the details of system 10 according to an exemplary embodiment of the present subject matter have been presented, an exemplary method 200 of operating system 10 to provide a consumer with useful information will be described. Although the discussion below refers to the exemplary method 200 of operating system 10 including refrigerator appliance 12, one skilled in the art will appreciate that the exemplary method 200 is applicable to the operation of a variety of other appliances and systems, and system 10 is used only for the purpose of explanation. For example, it should be understood that method 200 may be used, for example, for systems incorporating more than one appliance, including cooking appliances, dishwashers, or other suitable consumer or commercial appliances.

Referring now specifically to FIG. 3, an exemplary method 200 for operating system 10 will be described in detail. In general, FIG. 3 illustrates method 200 for operating a system 10 including refrigerator appliance 12, tablet 14, and remote server 16 according to exemplary embodiments of the present subject matter. In particular, method 200 enables tablet 14 to communicate with one or both of refrigerator appliance 12 and remote server 14 to send and receive useful information, as explained below. To perform method 200 using system 10, appliance controller 20 and tablet controller 96 may be programmed to send and receive messages between each other and with remote server 16, as described above.

Method 200 includes, at step 210, providing the user with tablet 14. As described above, tablet 14 is detachably mounted to refrigerator appliance 12 and includes a display 92 and controller 96. Controller 96 may include a wireless communication module in wireless communication with both remote server 16 and refrigerator controller 20.

At step 220, information is received by tablet 14 from remote server 16 and refrigerator controller 20. The information may relate to refrigerator appliance 12, such as the temperature of fresh food chamber 54 and freezer chamber 56, the remaining life of a water filter, the level of ice in dispensing assembly 70, etc. Alternatively, tablet 14 may receive information directly from remote server 16 or from the internet. Therefore, the information may also include news, weather, sports scores, recipes, photographs, calendars, etc.

Notably, the information received by tablet 14 may also include targeted advertisements. For example, advertisements may relate to consumer products related or not related to refrigerator appliance 12. Alternatively, advertisements may be related to additional products available by the manufacturer of refrigerator appliance 12. According to some exemplary embodiments, the user could terminate the advertisements or display only selected types of advertisements by paying a fee to the manufacturer. According to an exemplary embodiment, the advertisements and other information may be pushed automatically from remote server 16 to tablet 14 upon the occurrence of a specific event or at regular intervals. Other methods of sending, receiving, and displaying information are also possible and within the scope of the present subject matter.

Step 230 includes selectively displaying the information on display 92 in response to a user selected display configuration. In this regard, tablet 14 may be at least partially user configurable such that only particular kinds of information are displayed for the user. For example, the user may configure display 92 to provide information in a slideshow format or in multiple panes on display 92. Therefore, a user may select, e.g., four display panes displaying weather, news, family photographs, and advertisements, respectively.

In order to conserve energy usage, it may be desirable to display information only when a consumer is present to view the information. Therefore, display 92 may be configured to remain off until a triggering event causes it to become active and display information. Therefore, method 200 includes, at step 240, displaying information to the user when a triggering event occurs.

The triggering event may be any suitable event that is visible or detectable by tablet 14, refrigerator appliance 12, or any other component of system 10. For example, the triggering event may be a user pressing a button, an ice-maker being activated, the door being opened or closed, the filter being replaced, or movement being detected by a proximity sensor coupled to refrigerator appliance 12. Alternatively, if method 200 is used to operate a washing machine, triggers may include the pressing of a button, the dispensing of wash additive, the starting of a cycle, or the modification of a cycle parameter.

Alternatively, the triggering event may be any signal or communication generated in response to an internal control algorithm of an appliance. Using refrigerator appliance 12 as an example, controller 20 may trigger display 92 on tablet 14 when a certain condition or event occurs during the performance of an internal control algorithm. For example, triggering events may occur when the ice maker is full, when a specific cooling cycle is completed (e.g., turbo cool or turbo ice production), when a thawing or defrost operation is initiated or finished, or at the end of the water filter lifetime. Moreover, triggering events generated in response to internal control algorithms may change depending on the type of appliance being used. For example, triggering events for ranges may include the completion of a preheat cycle, the end of a preset cooking time, or the completion of a self-clean cycle. Triggering events for a clothes washer may include the completion of a wash cycle/phase or an indication of low wash additive in a bulk dispenser. Triggering events for a clothes dryer may include a damp alert indication or an indication that a cycle has been completed. Triggering events for a dishwasher may include the completion of a wash cycle or a low level indication of the rinse aid or wash additive. One skilled in the art will appreciate that these triggering events are used only for the purpose of explanation, and that other triggering events are possible and within the scope of the present subject matter.

One skilled in the art will appreciate that any other suitable user triggered events may be used, and that other such triggering events are possible and within the scope of the present subject matter. Moreover, one skilled in the art will appreciate that refrigerator appliance 12, tablet 14, and any other components of system 10 may be configured to operate in a variety of manners when triggering events occur or when certain communications are transmitted to or received by each component. For example, when tablet 14 is connected to refrigerator appliance 12 by a wired connection, tablet 14 may be configured to become a status communication device for refrigerator appliance 12 or act as a control center that enables a user to adjust operational parameters of refrigerator appliance 12. In this manner, according to an exemplary embodiment, controller 20 and user interface panel 74 may be eliminated entirely and tablet 14 may be used for operating refrigerator appliance 12.

The above described system 10 and method 200 of operating system 10 may be used to provide a user with timely, useful information and/or advertisements. In addition, the information may be provided on a detachable tablet 14 that is seamlessly integrated with and chargeable by refrigerator appliance 12. Moreover, tablet 14, while loosely integrated with refrigerator appliance 12 and controller 20, is operable as a standalone device, having its own battery pack 110 and controller 96. Therefore, tablet 14 may be easily replaceable and interchangeable with other devices, e.g., new versions of tablet 14.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A tablet for providing a user of a consumer appliance with information, the tablet comprising:
a display for providing information to a user;
a user interface configured for receiving user input; and
a communication module mounted within the tablet for enabling direct communication between the tablet and with both a remote server and an appliance controller,
wherein the tablet is removably mounted directly to the consumer appliance and may selectively display information received from the remote server and the appliance controller in response to the user input.

2. The tablet of claim 1, wherein the information provided to the user is appliance performance data.

3. The tablet of claim 1, wherein the user input is used to adjust one or more operational parameters of the consumer appliance.

4. The tablet of claim 1, wherein the consumer appliance is a refrigerator appliance and the tablet is mounted on a door of the refrigerator appliance.

5. The tablet of claim 4, wherein the display is configured to display information to the user when a triggering event occurs.

6. The tablet of claim 5, wherein the triggering event is any one of the user pressing a button, an icemaker being activated, the door being opened, movement being detected by a proximity sensor, or a trigger generated by the refrigerator appliance responsive to an internal control algorithm.

7. The tablet of claim 1, wherein the tablet comprises an energy storage device.

8. The tablet of claim 7, wherein the energy storage device is a lithium-ion battery pack, and wherein the consumer appliance further comprises a USB charger for charging the lithium-ion battery pack.

9. The tablet of claim 1, wherein the communication module is either a wired communication module or a wireless communication module for enabling wired communication and wireless communication, respectively, with the remote server and the appliance controller.

10. A consumer appliance, comprising:
a main body;
an appliance controller; and
a tablet removably mounted directly to the main body, the tablet comprising:
an energy storage device;
a display for providing information to a user;
a user interface configured for receiving user input; and
a wireless communication module mounted within the tablet for enabling the tablet to communicate directly and wirelessly with both the appliance controller and a remote server,
wherein the information provided to the display may be user selected from information received from the remote server and the appliance controller.

11. The consumer appliance of claim 10, wherein the information provided to the display is appliance performance data.

12. The consumer appliance of claim 10 wherein the user input is used to adjust one or more operational parameters of the consumer appliance.

13. The consumer appliance of claim 10, wherein the consumer appliance is a refrigerator appliance and the tablet is mounted on a door of the refrigerator appliance.

14. The consumer appliance of claim 13, wherein the display is configured to display information to the user when a triggering event occurs, the triggering event being any one of the user pressing a button, an icemaker being activated, the door being opened, movement being detected by a proximity sensor, or a trigger generated by the refrigerator appliance responsive to an internal control algorithm.

15. The consumer appliance of claim 10, wherein the consumer appliance comprises a USB charger for charging the energy storage device.

16. A method for communicating information to a user of a consumer appliance, the method comprising:
providing the user with a tablet that is directly and detachably mounted to the consumer appliance, the tablet comprising a display and a wireless communication module mounted within the tablet and in wireless communication with both a remote server and an appliance controller;
receiving information from the remote server and the appliance controller;
selectively displaying the information on the display in response to a user selected display configuration.

17. The method of claim 16, wherein the information displayed is appliance performance data.

18. The method of claim 16, further comprising adjusting one or more operational parameters of the consumer appliance in response to a user input.

19. The method of claim 16, further comprising displaying information to the user when a triggering event occurs, the triggering event being any one of the user pressing a button, an icemaker being activated, the door being opened, movement being detected by a proximity sensor, or a trigger generated by the consumer appliance responsive to an internal control algorithm.

20. The method of claim 16, wherein the tablet comprises an energy storage device, and the method further comprises charging the energy storage device using a USB charger coupled with the consumer appliance.

* * * * *